US010106432B2

(12) United States Patent
Darbha et al.

(10) Patent No.: US 10,106,432 B2
(45) Date of Patent: Oct. 23, 2018

(54) SOL-GEL PROCESS FOR SYNTHESIS OF NANOCRYSTALLINE OXIDES

(71) Applicant: Council of Scientific & Industrial Research, New Delhi (IN)

(72) Inventors: Venkata Ravi Kumar Darbha, Maharashtra (IN); Lakhsmi Vara Prasad Bhagavatula, Maharashtra (IN); Amol Arvind Kulkarni, Maharashtra (IN)

(73) Assignee: COUNCIL OF SCIENTIFIC & INDUSTRIAL RESEARCH (IN)

( * ) Notice: Subject to any disclaimer, the term of this patent is extended or adjusted under 35 U.S.C. 154(b) by 125 days.

(21) Appl. No.: 14/889,792

(22) PCT Filed: May 9, 2014

(86) PCT No.: PCT/IN2014/000321
§ 371 (c)(1),
(2) Date: Nov. 6, 2015

(87) PCT Pub. No.: WO2014/181361
PCT Pub. Date: Nov. 13, 2014

(65) Prior Publication Data
US 2016/0122195 A1    May 5, 2016

(30) Foreign Application Priority Data
May 9, 2013 (IN) .......................... 1384/DEL/2013

(51) Int. Cl.
*B01J 19/00* (2006.01)
*B01F 5/02* (2006.01)
*C01B 13/36* (2006.01)
*C01B 13/14* (2006.01)
*C01F 5/02* (2006.01)
(Continued)

(52) U.S. Cl.
CPC .............. *C01F 5/02* (2013.01); *B01F 5/0256* (2013.01); *B01F 15/00922* (2013.01); *B01J 19/0093* (2013.01); *C01B 13/36* (2013.01); *C01F 11/02* (2013.01); *C01G 25/02* (2013.01); *B01J 2219/00889* (2013.01); *B01J 2219/00891* (2013.01); *C01P 2002/60* (2013.01); *C01P 2002/72* (2013.01); *C01P 2002/82* (2013.01); *C01P 2004/54* (2013.01);
(Continued)

(58) Field of Classification Search
None
See application file for complete search history.

(56) References Cited

FOREIGN PATENT DOCUMENTS

DE    102006004350 A1    8/2007

OTHER PUBLICATIONS

Marchisio et al (Effect of Mixing and Other Operating Parameters in Sol-Gel Processes, Ind. Eng. Chem. Res., 2008, 47 (19), pp. 7202-7210).*
(Continued)

*Primary Examiner* — Melvin C. Mayes
*Assistant Examiner* — Michael Forrest
(74) *Attorney, Agent, or Firm* — Blank Rome LLP

(57) ABSTRACT

A Continuous flow synthesis of nanocrystalline metal oxides by rapid sol-gel process is disclosed. The process disclosed uses an impinging microjet micromixer device to obtain the nano crystalline metal oxides. A method of fabricating and assembling the impinging microjet micromixer is also disclosed herewith.

8 Claims, 5 Drawing Sheets

(51) Int. Cl.
   *C01G 25/02*   (2006.01)
   *C01F 11/02*   (2006.01)
   *B01F 15/00*   (2006.01)
(52) U.S. Cl.
   CPC ...... *C01P 2004/64* (2013.01); *C01P 2006/12* (2013.01); *C01P 2006/14* (2013.01)

(56) References Cited

OTHER PUBLICATIONS

V. Stengl et al., "Magnesium Oxide Nanoparticles Prepared by Ultrasound Enhanced Hydrolysis of Mg-alkoxides", Materials Letters, vol. 57, 2003. pp. 3998-4003.

Y. Diao, et al., "Hydrolysis of Magnesium Methoxide, Effects of Toluene on Gel Structure and Gel Chemistry", Chemistry of Materials, vol. 14, No. 1, 2002, pp. 362-368.

K. T. Ranjit et al., "Solvent Effects in the Hydrolysis of Magnesium Methoxide, and the Production of Nanocyrstalline Magnesium Hydroxie. An Aid in Understanding the Formation of Porous Inorganic Materials", Chemistry of Materials, vol. 17, 2005, pp. 65-73.

* cited by examiner

SOL-GEL PROCESS FOR SYNTHESIS OF NANOCRYSTALLINE OXIDES

RELATED APPLICATIONS

This application is a national phase application of PCT/IN2014/000321, filed May 9, 2014, which claims priority to Indian Patent Application No. 1384/DEL/2013, filed May 9, 2013, the entire contents of which are incorporated herein by reference.

FIELD OF THE INVENTION

The present invention relates to a sol-gel process for synthesis of nanocrystalline metal oxides. Particularly, the invention relates to continuous flow synthesis of metal oxides by the rapid sol-gel process preferably nanocrystalline Magnesium Oxide (NC—MgO). More particularly, the invention relates to a device with optimized parameters for synthesis of nanocrystalline metal oxides by rapid sol-gel process.

BACKGROUND AND PRIOR ART OF THE INVENTION

Continuous flow methods using microreactors has now proved their impact on process intensifications of organic compounds[1] and materials synthesis. The flow synthesis approach has been demonstrated for the synthesis of several nanomaterials (metals, metal oxides, quantum dots, polymeric nanoparticles, etc.) and their combinations. Although the flow synthesis approach offers a greater control over the properties of the materials than the conventional synthesis approach, these are still in nascent stages with respect to their applicability to complex systems.

NC—MgO, which is an effective catalyst for many organic reactions[5] and has been established as "destructive adsorbent" for toxic materials[6] and also finds use in various nano products. The surface area of the commercially available NC—MgO is ≥250 $m^2/g$ and it is prepared by sol gel process.

However there is continuous need to improve the processes used till now in terms of cost, time and overall efficiency.

Accordingly lot of research work is being going in the field. Klabunde and coworkers in Chem. Mater. 2002, 14, 362-368.

showed that adding toluene, as a spectator solvent during the gelation alters the gelation kinetics and increases the quality of the product in terms of surface area. This process involves the hydrolysis of $Mg(OCH_3)_2$ in presence of methanol and toluene as solvent mixture and forms rigid gel very rapidly (gelation time<30 s), refer Klabunde et al in J., Chem. Mater. 2005, 17, 65-73 and Chem. Mater. 2002, 14, 362-368. Typically, for any homogeneous reaction involving two or more reactants, the rate of mixing should be faster than the rate of reaction. In the case of NC—MgO, rapid mixing is necessary to achieve homogeneous nucleation and also better product quality with high surface area. Thus any extent of improper mixing can affect the scale-up of such a process similar to conventional batch to batch variation. The reaction for making the specific oxide gels are very fast and usually for such reactions, the extent of reaction in the reactor (typically the batch approach) depends upon the extent of homogeneity of the reaction mixture. Thus, rapid mixing yields better homogeneity in the reaction in the entire reaction mass.

Here comes in the requirement of Confined Impinging Jet Reactors (CIJs) which are used successfully for very fast reactions like precipitations, refer Barresi et al in, AIChE J. 2006, 52, 1877-1887. CIJ are well studied experimentally and theoretically to understand and characterize the mixing. They are known to have advantages over stirred tank reactors, refer Gavi, E.; Marchisio, D. L.; Barresi, A. A., Chem. Eng. Sci. 2007, 62, 2228-2241 and Johnson, B. K.; Prud'homme, R. K., AIChE J. 2003, 49, 2264-2282.

In CIJ's, mixing doesn't occur in "wall free environment" and this situation is highly unfavourable for the synthesis of metal oxides in geheral and NC—MgO particularly where the rigid gel formation may block the channel.

Hence to overcome the limitations of prior art and long standing need of improvement in synthesis of nanocrystal metal oxides, Inventors have come up with new approach to synthesize commercially desirable NC—MgO using continuous flow method by the rapid sol-gel process wherein great deal of flexibility is offered in terms of achieving certain angles and jet lengths unlike methods of prior art.

OBJECTS OF THE INVENTION

Main objective of the present invention is to provide a continuous flow synthesis of metal oxides formed by the rapid sol-gel process for the synthesis of nanocrystalline metals. Another objective of the present invention is to provide the specific flow rate and impingement angle that yield high surface area.

Yet another object of the present invention is to provide a device wherein a continuous flow synthesis of metal oxides formed by the rapid sol-gel process for the synthesis of nanocrystalline metals may be carries out.

SUMMARY OF THE INVENTION

Accordingly, present invention provides an impinging jet micromixer comprising inlets for reactant (1) and (2) being connected to metallic blocks having microscopic bore (6) being connected to support plates (3) using support tension springs (4) and screw for adjusting angle of the impinging sections (5) wherein mixing zone (7) is formed by the impinging jets coming out of said bores (6).

In an embodiment, present invention provides a sol-gel process for continuous flow synthesis of nanocrystalline metal oxides using the impinging jet micromixer comprising the steps of:

i. pumping of water and metal alkoxide solution in a solvent continuously through inlets (1) and (2) followed by mixing in a mixing zone;

ii. synthesizing wet gel samples at flow rates in the range of 10 to 20 mL/min for the jet diameter in the range of 100-1000 micron and at angles between jets in the range of 70-140 degree to obtain a gel;

iii. ageing the gel as obtained in step (ii), vacuum drying at temperature in the range of 70 to 90° C. for a period in the range of 8 to 12 hours followed by calcination at a temperature in the range of 350-600° C.; and iv. drying the gel as obtained in step (iii) at a temperature in the range of 80-90° C. to yield nanocrystalline Metal Oxide having BET surface area in the range of 220-520 $m^2/g$ and average crystallite size is in the range of 4.5-6.0 μm.

In another embodiment of the present invention, the solvent used is methanol and toluene such that the toluene to methanol volume ratio becomes 1.60 upon the addition of equal amounts of both the reactants.

In yet another embodiment of the present invention, the rate of mixing is faster than the rate of reaction to achieve homogeneous nucleation.

In yet another embodiment of the present invention, the metal alkoxide is selected from the group consisting of Zirconium alkoxide, Strontium alkoxide, and Magnesium alkoxide.

In yet another embodiment of the present invention, the nanocrystalline metal oxides is selected from the group consisting of Zirconium oxide, Strontium oxide, and magnesium oxide.

In yet another embodiment of the present invention, the ratio of metal alkoxide to water is 1:2 to 1:5.

In yet another embodiment of the present invention, aspect ratio between (a/b) the length of the mixing zone and thickness of the mixing zone is in the range of 0.6-1.2 and preferably 1.

In yet another embodiment of the present invention, the thickness of the mixing zone in the micromixer is in the range of 7.2 to 20.7 μm.

In another embodiment, present invention provides a method of fabricating and assembling the impinging microjet micromixer comprising attaching two micro-machined segments (6) on a backbone structure of micromixer so as to allow a change in the angle between the microchannels in the same plane comprising the steps of:
  i. machining the microchannels of 0.3 mm diameter in SS316 segments (6);
  ii. adjusting the two segments (6) simultaneously using tension springs (4) to ensure that the two segments (6) are held at a fixed distance and at a fixed angle by using the rotation screw (5), to get equal angular distance from the point of jet interaction;

In another embodiment, present invention provides a method of operating impinging microjet micromixer comprising pumping two reactant fluids from the individual segments using syringe pumps so as to exit the injected fluids from the segments at high velocity and intersect to yield a thin sheet of mixing zone followed by a thread like gel.

In yet another embodiment of the present invention, the velocity of the jets is adjusted to get stable mixing zone.

DETAILED DESCRIPTION OF THE INVENTION

Figure 1:
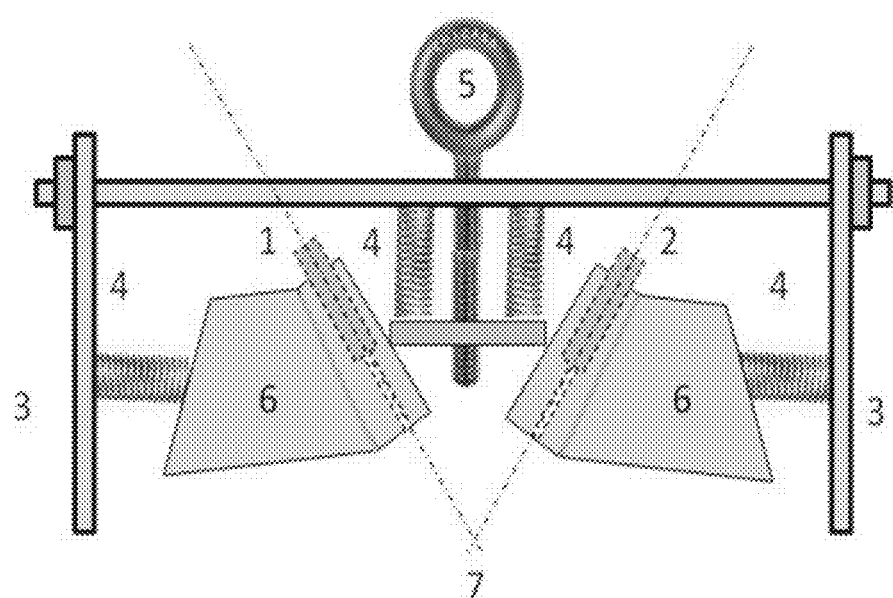
FIG. 1: Schematic of the impinging jet micromixer having (1) and (2) Inlets for reactant, (3) support plates, (4) support tension springs, (5) screw for adjusting angle of the impinging sections, (6) metallic blocks having microscopic bore and (7) impingement/mixing zone.

The invention discloses a continuous flow approach for the synthesis of nano-crystalline oxides. The invention further discloses a transformed rapid sol gel process to continuous flow process using an impinging jet micromixer wherein high surface area is achieved for an impingement angle of 120°, flow rates for individual reactants (jet) in the range of 10 to 20 mL/min (for the jet diameter 300 micron). The invention further provides a device wherein the reaction may be carried out to obtain metal nanocrystals of desired parameters preferably NC—MgO.

In accordance with the current invention the nanocrystalline metal oxides which may be prepared may be picked from Zirconium, Strontium, and MgO (NC—MgO), preferably NC—MgO.

Present invention provides a continuous flow synthesis of metal oxides by the rapid sol-gel process for the synthesis of nanocrystalline MgO (NC—MgO) wherein the process comprises:
Preparing solution of 0.5-1.0 M $H_2O$ and 0.1 to 0.6M $Mg(OCH_3)_2$ using methanol and toluene mixtures such that the toluene to methanol volume ratio becomes 1.60 upon the addition of equal amounts of both the reactants.
pumping of these water and solutions of metal alkoxides in solvent continuously through inlets (1) and (2) followed by mixing in a mixing zone formed by the impinging jets coming out of the bores in section (6) of the device;
Wet gel samples were synthesized at flow rates in the range of 10 to 2 mL/min (for the jet diameter 100 to 1000 micron) and at angles (between jet)s varying in the range of 70-140 degree.
The gel was collected in samples vials and allowed to age for 1 day, then vacuum dried at 70-90° C. for 8-12 hours followed by calcination at range 350-600° C. for 4-6 hours.
The gels were dried to yield NC—MgO of BET surface area ranging from 220-520 $m^2/g$ and subjected to characterization.

The BET surface area of the nanocrystalline metal oxide obtained is preferably in the range of 250-350 $m^2/g$.

The invention the angle between the jets (impingement) is between the range of 70-120 degrees.

The average aspect ratio between the jets is between the range of 0.6-1.2 and preferably 1.

The average thickness of the mixing zone in the micromixer is in the range of 7.2 to 20.7 μm.

The flow rates for individual reactants (jet) are is in the range of 10 to 20 mL/min.

The average crystallite size of nanocrystalline metal oxides is in the range of 4.5-6.0 μm.

The microjet is fabricated and assembled such that the method comprises: attaching two micro-machined segments on a backbone structure that allows changing the angle between the microchannels in the same plane. A detailed schematic is shown in FIG. 1.

The microchannels of 0.3 mm diameter were machined in SS316 segments.

The two segments can be adjusted simultaneously to get equal angular distance from the point of jet interaction. Two reactant fluids were pumped in the individual segments.

The injected fluids exit the segments at high velocity and intersect to yield a thin sheet of mixing zone followed by a thread.

The velocity of the jets was adjusted to get stable mixing zone. The images of the mixing zone at different jet velocities and at different angle between the jets were recorded by using high speed camera with a frame rate of 500 frames per second (Red lake, USA). The images were analyzed using Image-Pro Plus (version 5.1) software.

Effect of Jet Impingement Angle (.,)

Figure 2:
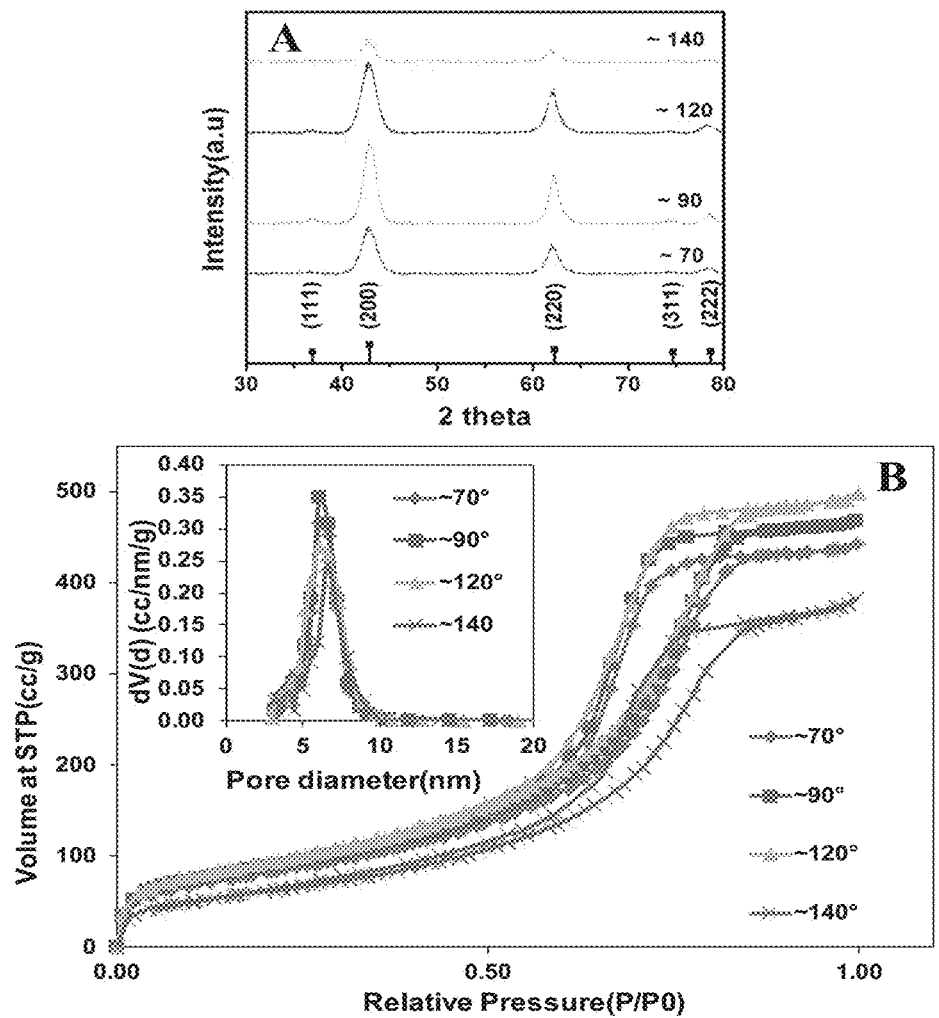
FIG. 2: (A) XRD (B) $N_2$ sorption isotherms of the NC—MgO samples and inset of (B) shows the pore size distribution of the samples which were synthesized at different angle between the jets.

Considerable change in the area and thickness of the mixing zone was observed by varying the angle of impingement between the jets. The volumetric flow rate of the individual jets was maintained as 15 mL/min to obtain strong and stable jets followed by a stable mixing zone. FIG. 2 shows the x-ray diffraction and $N_2$-sorption isotherms of the gel samples collected. The summary of the characterization details of the sample which were synthesized at different angle between the jets is presented in Table 1.

TABLE 1

| Sample | Angle between the jets | BET Surface area (m$^2$/g) | Pore volume (cc/g) | Crystallite size (nm) from XRD (nm) |
|---|---|---|---|---|
| 1 | 70° | 299 | 0.69 | 4.7 |
| 2 | 90° | 321 | 0.72 | 5.5 |
| 3 | 120° | 339 | 0.77 | 4.7 |
| 4 | 140° | 228 | 0.59 | 5.8 |

Figure 3:
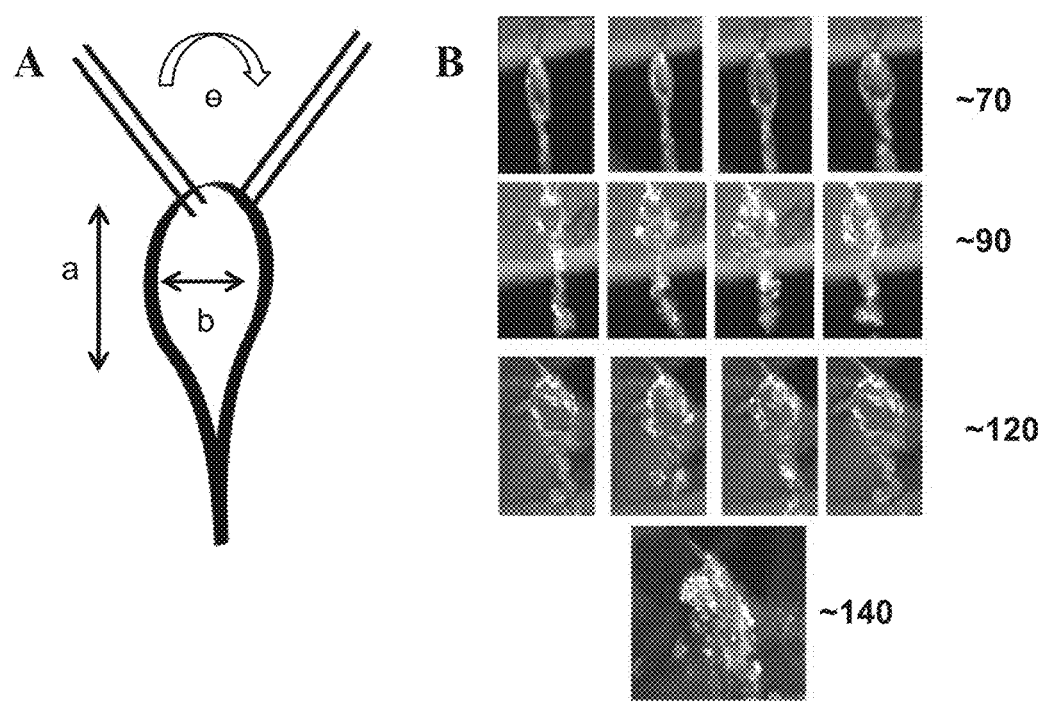
FIG. 3: (A) Schematic of the mixing zone (B) High speed camera images of the mixing zone at different angle between the jets.
Figure 4:
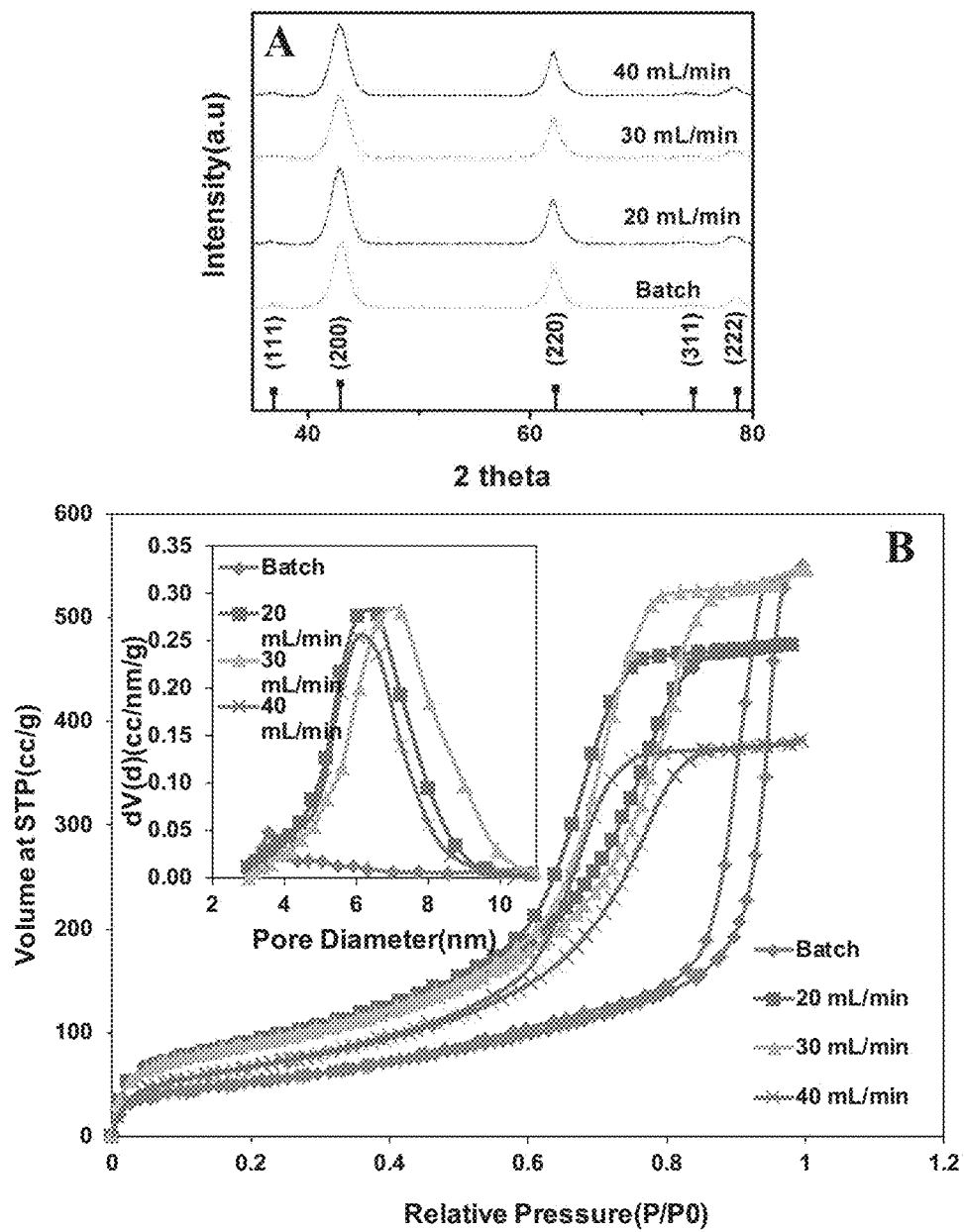
FIG. 4: (A) XRD (B) $N_2$ sorption isotherms of the NC—MgO sample and inset of (B) shows the pore size distribution of the samples which were synthesized at different flow rates, the angle between the jets was kept constant (120°).
Figure 5:
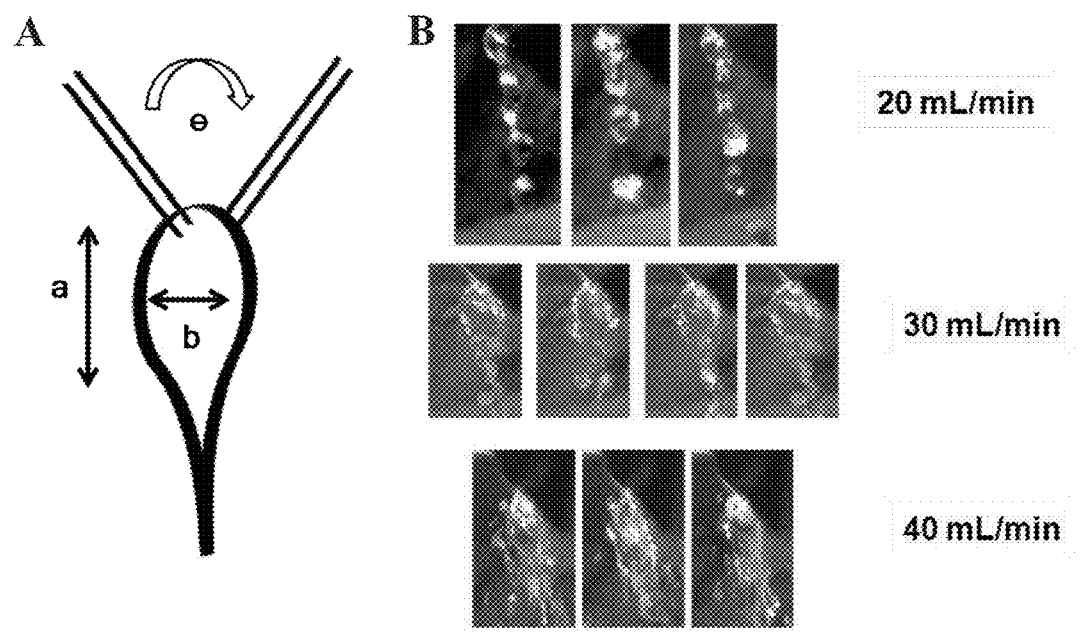
FIG. 5: (A) Schematic of the mixing zone (B) High speed camera images of the mixing zone at different flow rates and the angle between the jets is 120°.

There was a small but gradual increase in the BET surface area of the samples obtained as the angle of jet impingement varied from 70° to 120°. Maximum BET surface area (~350 m$^2$/g) was observed at 120°. Upon increasing the angle further from 120° to 140°, BET surface area of the sample decreased from 350 to 228 m$^2$/g. This reduction in the surface area is expected to be a strong function of the nature of mixing and the local homogeneity in the mixing zone. In view of this, experiments were carried out to understand the nature of mixing zone using high speed imaging (Typical residence time in the mixing zone was in the range of 0.5 to 20 ms). FIG. 3A shows the schematic of the mixing zone and 3B represents the high speed camera images of the mixing zones at different impingement angles between the jets ($\square_j$). The aspect ratio (a/b) of the mixing zone and thickness of the mixing zone at different angles between the jets, analyzed using high speed camera images. It can be noticed that very thin mixing zone with aspect ratio close to unity (i.e. a≈b) was obtained when $\square_j$ was 120°. Since the volume of the reagents pumped was constant and equal flow rates were maintained for both the jets, the enhancement in the mixing was purely due to a thinner mixing zone with larger area. This enhanced mixing helps to achieve uniformity in the concentration and thereby have uniform reaction rate (more homogeneous nucleation) which is mandatory and favorable for fast reactions. Table 2 summarizes the comparison between thickness of the mixing zone and surface area of the sample at different jet impingement angles. Since the impingement region for and beyond 140° no more remains planar, it was difficult to measure the aspect ratio and average thickness of the same.

TABLE 2

Effect of Reynolds Number ($R_e$)

| Angle between the jets | Average aspect ratio | Average thickness of the mixing zone (μm) | BET surface area (m$^2$/g) |
|---|---|---|---|
| ~70 | 2.1 | 14.3 | 299 |
| ~90 | 1.8 | 13.4 | 320 |
| ~120 | 1.5 | 8.7 | 340 |
| ~140 | — | — | 228 |

Apart from the dimensions of the impinging region, its structure and the residence time in the mixing zone also affects the extent of mixing in these domains. Based on our observations that high surface area is achieved for an impingement angle of 120°, further studies were carried out to understand the effect of residence time and structure of mixing zone on the properties of dry gel at this angle. The jet Reynolds number ($Re_j$=Duρ/μ) was varied by changing the superficial jet velocity (u) while keeping the jet diameter (300 $\square$m) and angle ($\square_j$=120° constant. With increasing velocity or flow rate of the reactants, the shape of the impingement zone (mixing zone) changed considerably thereby changing its and thickness. This would affect the surface area of the material significantly. The flow rates for individual reactants (jet) were varied in the range of 10 to 20 mL/min, beyond which it was difficult to get stable mixing zone. Table 3 summarizes the analysis of the gel synthesized at different Re.

TABLE 3

| Sample | Total flow rate (mL/min) | Re | BET Surface area (m$^2$/g) | Pore volume (cc/g) | Crystallite size (nm) from XRD |
|---|---|---|---|---|---|
| 1 | 20 | 1040 | 327 | 0.73 | 4.9 |
| 2 | 30 | 1560 | 322 | 0.85 | 4.6 |
| 3 | 40 | 2080 | 250 | 0.59 | 4.7 |
| batch | — | — | 191 | 0.85 | 5.6 |

BET Surface area of the samples which were synthesized in continuous flow method was higher than the sample synthesized in batch mode. For all the samples synthesized in continuous flow methods using jet micromixer, H1 type adsorption isotherm was observed, indicating the porous nature of the sample is due to aggregation of spherical particles. While in batch sample, H3 type adsorption isotherm (slit like pores) was observed. Very narrow pore size distribution was observed in the sample synthesized in continuous flow methods than the batch sample. When the total flow rate increased from 30 mL/min to 40 mL/min, the surface area of the synthesized NC—MgO decreased from 322 m$^2$/g to 250 m$^2$/g. We verified these observations a few times and the results were reproducible within a range of ±4%. With increasing liquid flow rate the mixing zone was found to deviate from planar topology, which is also captured in the high speed camera images of the mixing zone. At the low flow rates, although both the reactant fluids were in contact for sufficiently longer times the thickness of the mixing zone did not affect the final surface area of the material greatly.

EXAMPLES

Following examples are given by way of illustration therefore should not be construed to limit the scope of the invention.

Example 1

A microjet device was fabricated such that it comprises of two micro machined segments attached on a backbone structure that allows changing the angle between the microchannels in the same plane. The microchannels of 0.3 mm diameter were machined in SS316 segments. Individual segments have an inclination of 60° to the abscissa. The two segments can be adjusted simultaneously to get equal angular distance from the point of jet interaction.

Example 2

0.4 M $Mg(OCH_3)_2$ in methanol and toluene mixtures, such that the toluene to methanol volume ratio becomes 1.60 and water were taken. Both the reactants were pumped at equal flow rates using pumps, Wet gel samples were synthesized at different flow rates and at different angles between jets (table 1, 2 and 3). Subsequently, the gel was collected in samples vials. Gels were allowed to age for 1 day, then vacuum dried at 90° C. for 12 hours followed by calcination at 500° C. for 1 hour. The dried gels were subjected to characterization.

Synthesis of NC—MgO was also carried out in batch process. In batch process, to 0.8 M water, equal amount of 0.4 M $Mg(OCH_3)_2$ solution (prepared in toluene—methanol mixtures) was added in a beaker at 27° C. and solution turned to rigid gel within 30 sec. The wet gel was dried as explained above to get NC—MgO.

Example 3

Synthesis of ZrO2 Gel using Alkoxide as Precursor 20 ml solution of toluene and n-propanol was prepared (equal volumes of Toluene and n-propanol). Different amounts of concentrated nitric acid (70%) were used as catalyst for this process. Upon mixing the solution of 2 ml of Zirconium propoxide in toluene and n-propanol and the catalyst in aqueous medium it yields gels. With 0.235 ml HNO3 gel is formed within 20 s while with 0.110 ml of HNO3 is formed within 5 s. Dried gel the sample in vacuum drying oven at 383° K. The surface area of gels with catalyst was in the range of 266-278 $m^2/g$. In the absence of catalyst it takes 2 hours for the formation of gel and the surface area is below 200 $m^2/g$.

Characterization

FT-IR spectra of the samples were recorded using Perkin Elmer FT-IR spectrophotometer, in the wave number range of 4000-450 $cm^{-1}$ with a resolution of 4 $cm^{-1}$.

(1) X-ray diffraction patterns of the dried and calcinated samples were recorded on the PanalyticalXpert instrument operated at 40 kV and 30 mA using Cu Kα radiation. X-ray diffraction pattern of the sample were recorded in the 2e range of 10-80 with scan rate of 2.3°/min.

(2) $N_2$ adsorption and desorption isotherms of the samples were recorded by using Quantachrome-Autosorb instrument. Surface area of the sample was calculated by applying BET method to adsorption isotherm (relative pressure in the range of 0.05-0.03). Poresize distribution was calculated by applying BJH method to desorption isotherm. Total pore volume was calculated at the maximum relative pressure value in the isotherm.

(3) Small quantity of the sample dispersed in ethanol and the dispersed sample was coated on TEM grid and allowed to dry. Transmission electron micrographs of the sample were recorded using Technai-T20 transmission electron microscopy, operated at 300 kV.

ADVANTAGES OF THE INVENTION

The surface area of the sample, synthesized through continuous flow methods was comparable to market standards with high reproducibility and consistency.

The process will have no issues like charging, discharging, cooling/heating of batch etc. So, the overall process time will be significantly smaller than a batch.

The synthesis capacity of the device can be increased to any level using multiple impinging jets (anywhere between 10 to 1000, depending upon the requirement) or using a 2D jet of any width to compensate for multiple 1D jets.

Post processing time is highly reduced as compared to conventional processes.

We claim:

1. A sol-gel process for continuous flow synthesis of a nanocrystalline metal oxide using an impinging jet micromixer, wherein the impinging jet micromixer comprises an inlet for reactant 1 and an inlet for reactant 2 each connected to a metallic block having a microscopic bore, the metallic block is connected to a support plate using a support tension spring and a screw for adjusting an angle of impinging jets, wherein a mixing zone is formed by the impinging jets coming out of the microscopic bore, further wherein an angle between the impinging jets is 70-120 degrees and a ratio of a length of the mixing zone to a thickness of the mixing zone is 0.6-1.2, the sol-gel process comprises the steps of:
i. pumping a water solution in a solvent and a metal alkoxide solution in the solvent continuously through the inlet for reactant 1 and the inlet for reactant 2, respectively, followed by mixing, in the mixing zone:
ii. synthesizing a wet gel at a flow rate of 10 to 20 ml/min with a jet diameter of 100-1000 micron and at the angle 70-120 degrees;
iii. ageing the wet gel obtained in step (ii) to provide an aged gel, and
iv. vacuum drying the aged gel at a temperature of 70 to 90° C. for a period of 8 to 12 hours, followed by calcination at a temperature of 350-600° C. to obtain the nanocrystalline metal oxide.

2. The process according to claim 1, wherein the solvent used is a mixture of methanol and toluene in a toluene to methanol volume ratio of 1.60.

3. The process according to claim 1, wherein a rate of mixing is faster than a rate of reaction to achieve a homogeneous nucleation.

4. The process according to claim 1, wherein the metal alkoxide is selected from the group consisting of Zirconium alkoxide, Strontium alkoxide, and Magnesium alkoxide.

5. The process according to claim 1, wherein the nanocrystalline metal oxide is selected from the group consisting of Zirconium oxide, Strontium oxide, and magnesium oxide.

6. The process according to claim 1, wherein a molar ratio of metal alkoxide to water in step (i) is 1:2 to 1:5.

7. The process according to claim 1, wherein the ratio of the length of the mixing zone to the thickness of the mixing zone is 1.

8. The process according to claim 1, wherein the thickness of the mixing zone is 7.2 to 20.7 μm.

* * * * *